Dec. 9, 1952 E. W. BULL 2,621,307

SCANNING CIRCUIT ARRANGEMENT FOR TELEVISION
AND THE LIKE APPARATUS

Filed Nov. 25, 1947

Inventor:
E. W. BULL
By: J. O. Allen
Atty.

Patented Dec. 9, 1952

2,621,307

UNITED STATES PATENT OFFICE 2,621,307

SCANNING CIRCUIT ARRANGEMENT FOR TELEVISION AND THE LIKE APPARATUS

Eric William Bull, Hounslow, Middlesex, England, assignor to Electric & Musical Industries Limited, Hayes, England, a company of Great Britain Application November 25, 1947, Serial No. 787,994
In Great Britain December 4, 1946

4 Claims. (Cl. 315—26)

Figure 1:
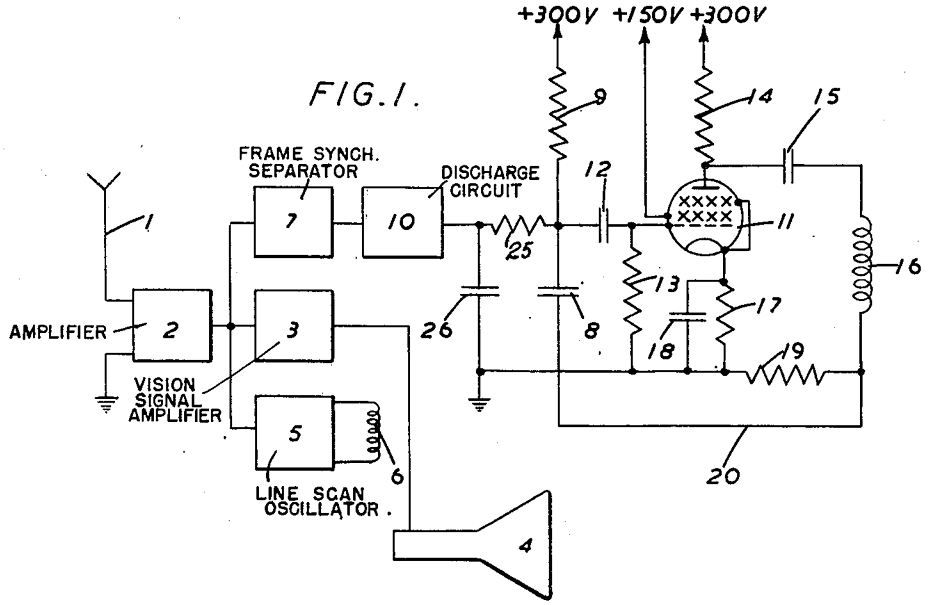

This invention relates to negative feedback amplifiers and it relates especially but not exclusively to scanning circuit arrangements for television and like apparatus of the kind wherein the lines scanned during alternate frames are arranged to interlace, and wherein the means for causing the frame scanning deflections comprises a negative feedback amplifier. Such scanning circuit arrangements are referred to hereinafter as arrangements of the kind described.

In one form of arrangement of the kind described which is commonly employed, the frame frequency scanning waveform is generated by alternately charging a condenser and rapidly discharging it through the valve of a blocking oscillator when said valve is periodically rendered conducting. However, with this form of arrangement it is found that the lines scanned dnring alternate frames are liable to interlace incorrectly. One cause of incorrect interlacing which is well known is the effect of stray voltages at line frequency on the timing of said oscillator, but even if precautions are taken to ensure correct timing of said oscillator the lines scanned during alternate frames are still liable to interlace incorrectly.

The main object of the present invention is to obviate or reduce this liability to incorrect interlacing.

I have found that a frequent cause of incorrect interlacing is that the valve of said amplifier is caused to function temporarily as a rectifier because the waveform applied to the control electrode of the amplifier valve comprises a rapidly varying or transient portion corresponding to the discharging of said condenser and the delay which occurs for this transient portion to pass through the negative feedback path is such that the resultant waveform applied to the control electrode comprises negative excursions which cause the potential of the control electrode to be driven below the cut-off potential for the amplifier valve. Moreover, the output circuit of said amplifier readily picks up voltages of line frequency because said output circuit comprises frame frequency scanning coils or plates which are usually close to the line frequency scanning coils or plates, and voltages of line frequency which are picked up are of course also fed back via said negative feedback path to said control electrode, and, if said valve functions as a rectifier, said voltages modulate the frame frequency scanning waveform with voltages of line frequency and with harmonics thereof, the odd harmonics having frequencies which are not multiples of the frame frequency (though they are multiples of the picture frequency). As a consequence relative displacement occurs between alternate frames causing incorrect interlacing of the lines scanned during alternate frames.

According to the present invention there is provided a scanning circuit arrangement of the kind described wherein the input of said amplifier is connected to a source of frame frequency oscillations of sawtooth waveform having transient portions of short duration and means is provided whereby the duration of said transient portions is caused to exceed the delay which occurs for said transient portions to pass through the negative feedback path of said amplifier, whereby rectification by said amplifier is effectively avoided.

According to the present invention in one of its aspects there is provided a negative feedback amplifier for amplifying signals having transient portions wherein means is provided for lengthening the duration of said transient portions so that the duration of said transient portions exceeds the delay which occurs for said transient portions to pass through the negative feedback path of said amplifier.

Figure 2:
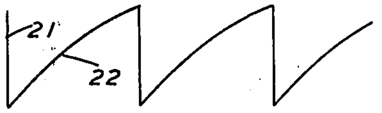
Figure 3:
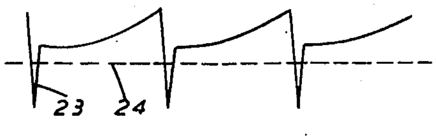
Figure 4:
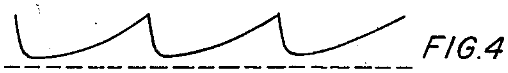
Figure 5:
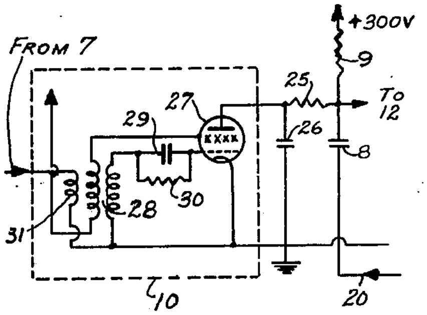

In order that the said invention may be clearly understood and readily carried into effect, the same will now be more fully described with reference to the accompanying drawing, in which:

Figure 1 diagrammatically illustrates a television receiver provided with a scanning circuit arrangement according to one example of the invention, Figures 2 to 4 are idealised waveform diagrams explanatory of the operation of the circuit arrangement of Figure 1, and Figure 5 diagrammatically illustrates a detail of the receiver illustrated in Figure 1.

The television receiver illustrated in Figure 1 is shown partly in block form and is designed to receive television signals comprising vision signals interspersed with line and frame frequency synchronising signals. Received signals are picked up by the aerial 1 and are fed to any suitable form of amplifier 2 and from the output of which vision signals are separated and amplified in amplifier 3 prior to feeding them to the control electrode of a cathode ray tube 4 in which the picture is reconstituted. Line frequency synchronising signals are separated in a separator 5 and are caused to synchronise the generation of line frequency deflecting waveforms in known manner which are applied to scanning coils indicated at 6 for deflecting the beam of the cathode ray tube 4 at line frequency. Frame frequency synchronising signals are separated in separator 7 and serve to synchronise the generation of frame frequency deflecting waveforms for causing deflection of the cathode ray beam in the tube 4 at frame frequency. The frame frequency scanning waveform is generated by charging the condenser 8 from a source of potential via a resistance 9 and periodically discharging the condenser 8 by means of a discharger circuit indicated at 10 and which may comprise a blocking oscillator or multivibrator or other device which is triggered by the frame frequency synchronising signals. If the discharger circuit 10 is a blocking oscillator, it may be of conventional construction, comprising as shown in Figure 5 a discharger valve 27 having its anode connected to the condenser 8 by the resistance 25 and its anode-to-cathode path shunted by the condenser 26. The valve 27 has screen and control electrodes regeneratively coupled by a transformer 28 while a condenser 29 shunted by a leak resistance 30 is connected in the lead to the control electrode in known manner. Synchronising signals from the separator 7 are also applied in known manner to a third winding 31 of the transformer 28. The voltage set up across the condenser 8 is applied to the control electrode of an amplifier valve 11, shown as a pentode, via a coupling condenser 12 and grid leak 13, the amplified voltage set up across the load resistance 14 of valve 11 being applied through blocking condenser 15 to the frame frequency scanning coils indicated at 16. The cathode of the valve 11 is biassed by resistance 17 shunted by condenser 18 and between the lower end of the coil 16 and the cathode of the valve 11 there is provided, as shown, a resistance 19 the potential variations across which are fed via lead 20 to the condenser 8 in negative sense so as to linearise the deflecting waveform in known manner. The circuit so far described is a typical circuit for generating frame frequency sawtooth oscillations and when such a circuit is employed in a television receiver with interlaced scanning it is found that incorrect interlacing not infrequently occurs.

Figure 2 of the drawings illustrates the waveform of the voltage which is generated in the known form of circuit so far described in Figure 1 and which is set up across the condenser 8 in the absence of negative feedback from the resistance 19. The voltage which is to be amplified by the valve 11 thus comprises a portion 21 of a rapidly varying or transient nature which serves to effect the return stroke of the cathode ray beam and corresponding to the discharge period of the condenser 8 and a slowly varying portion 22 which corresponds to the charging period of the condenser 8. When the transient portion 21 is applied to the valve 11, the delay which occurs for this transient to pass through the feedback path to the control electrode of the valve 11 is such as to cause the waveform, shown in Figure 3, to be applied to the control electrode of the valve 11, such waveform as shown comprising negative excursions 23 which cause the potential of the control electrode of valve 11 to be driven below the cut-off potential for the valve 11 which is indicated by the dotted line 24 in Figure 3, with the result that temporarily the valve 11 will function as a rectifier thus giving rise to incorrect interlacing due to the coupling which exists between the line and frame frequency deflecting coils as mentioned above. In order to overcome this difficulty a resistance 25 is provided between the discharging circuit 10 and the condenser 8 and preferably a further condenser 26 is connected between the end of the resistance 25 connected to the discharging circuit and earth, as shown. During the charging period of the condenser 8 the condenser 26 is simultaneously charged via the resistances 9 and 25 and when the circuit 10 is triggered to discharge the condenser 8 the condenser 26 is rapidly discharged by the discharger circuit 10 but the condenser 8 is more slowly discharged via the resistance 25. Thus the period of discharge of the condenser 8 is increased and by suitably choosing an appropriate value for the resistance 25 the time of discharge of the condenser 8 is made sufficiently long so that the feedback potential from the resistance 19 reaches the control electrode of the valve 11 before the transient has disappeared from the control electrode so that no negative excursions 23 appear at the control electrode of valve 11 of a sufficient magnitude to drive the control electrode to such a potential that the valve 11 can function as a rectifier. The potential waveform which is thus set up across the condenser 8, including the variation of potential brought about by negative feedback, is as shown in Figure 4.

In one example of the invention suitable for use in a television receiver in which twenty-five pictures are reproduced per second, each picture consisting of 405 lines in two interlaced frames each of 202½ lines, the value of the resistance 25 may be 10,000 ohms, and the magnitude of the condenser 26 may be .01 $\mu$f., and may in some cases be constituted by stray capacities.

The presence of the resistance 25 has, in effect, the property of lengthening the duration of very sudden changes in amplitude of an applied wave by attenuating those high frequency components which tend to cause distortion owing to delay in the feedback path. Thus, in one aspect the present invention is applicable in general to negative feedback amplifiers for amplifying signals having transient portions, said transient portions occurring so rapidly that owing to delay in the negative feedback loop the feedback potentials do not reach the control electrode of the amplifier before the transients have disappeared from the control electrode, thus setting up undesired excursions in the amplified signals. This difficulty can be reduced or avoided by employing the principle described in connection with Figure 1 in which means are inserted for reducing the steepness of the transients so that the transients can be fed back to the control electrode of the amplifier before the transients in the applied signal have disappeared from the control electrode.

It will also be understood that the invention is not restricted to arrangements such as illustrated in Figure 1, and in an alternative arrangement as applied to a television receiver the duration of the transient portion of the wave-form applied to the control electrode of the valve 11 may be caused to exceed the aforesaid delay by discharging the condenser 8 through a discharge valve in the discharger circuit 10, the conductive period of said valve being of longer duration than said delay.

What I claim is:

1. A scanning circuit arrangement for television and like apparatus, comprising means for producing line scanning deflections of the electron beam in an electron discharge device such as a cathode ray tube, means for producing frame scanning deflections of said electron beam to scan interlacing lines during alternate frames, said latter means comprising a source of frame frequency oscillations of sawtooth waveform having transient portions of short duration, a thermionic valve amplifier having an input circuit, an output circuit and a negative feedback path from said output circuit to said input circuit forming a negative feedback loop, a high frequency attenuating filter connecting said source to the input of said amplifier for protracting said transient portions to cause their duration to exceed the delay time for transient signals to pass around the negative feedback loop for said amplifier.

2. In a scanning circuit arrangement for television and like apparatus operating with interlaced scanning, a frame scanning circuit comprising a condenser, means for charging said condenser relatively slowly, a normally blocked discharging path for said condenser, means for periodically unblocking said discharging path to discharge said condenser relatively rapidly to thereby cause sawtooth waveform variations to be set up across said condenser, cathode ray beam deflecting means, a thermionic valve amplifier for feeding variations set up across said condenser to said beam deflecting means, and a negative feedback path from said beam deflecting means to the input of said amplifier forming a closed loop circuit, said discharging path including a resistive impedance proportioned to protract the discharge time of said condenser to cause said time to exceed the delay time of said closed loop circuit for transient signals.

3. Television or like apparatus comprising an electron discharge device such as a cathode ray tube, means for producing line scanning deflections of the electron beam in said electron discharge device, means for producing frame scanning deflections of said electron beam to scan interlacing lines during alternate frames, said latter means comprising a condenser, a resistance connecting said condenser to a source of charging potential, a normally blocked discharge valve, a resistance connecting said condenser to the anode of said valve and forming with said valve a discharge path for said condenser, means for periodically unblocking said valve to its anode to discharge said condenser relatively rapidly to cause sawtooth waveform variations to be set up across said condenser, electron beam deflecting means, and a negative feedback thermionic valve amplifier for feeding variations set up across said condenser to said beam deflecting means, said second-mentioned resistance having a magnitude to substantially protract the discharge time of said condenser through said discharge path.

4. In a scanning circuit arrangement for television and like apparatus operating with interlaced scanning, a frame scanning circuit comprising a condenser, a resistance connecting said condenser to a source of charging potential, a normally blocked discharge valve, a resistance connecting said condenser to the anode of said valve, a further condenser connected to the anode of said valve and shunting the discharge path of said valve, means for periodically unblocking said valve to its anode to discharge said first condenser and thereby cause sawtooth waveform variations to be set up across said first condenser, cathode ray beam deflecting means, a thermionic valve amplifier for feeding variations set up across said first condenser to said beam deflecting means, and a negative feedback path from said beam deflecting means to the input of said amplifier forming a closed loop circuit, said second-mentioned resistance and said second-mentioned condenser forming means to protract the discharge time of said first condenser to cause said time to exceed the delay time of said closed loop circuit for transient signals.

ERIC WILLIAM BULL.

REFERENCES CITED

The following references are of record in the file of this patent:

UNITED STATES PATENTS

| Number | Name | Date |
|---|---|---|
| 2,229,702 | Larsen | Jan. 28, 1941 |
| 2,235,131 | Wheeler | Mar. 18, 1941 |
| 2,241,762 | Blumlein | May 13, 1941 |
| 2,251,851 | Moore | Aug. 5, 1941 |
| 2,284,378 | Dome | May 26, 1942 |
| 2,309,672 | Schade | Feb. 2, 1943 |
| 2,360,697 | Lyman | Oct. 17, 1944 |
| 2,360,857 | Eldredge | Oct. 24, 1944 |